US006152348A

United States Patent [19]
Finn et al.

[11] Patent Number: 6,152,348
[45] Date of Patent: Nov. 28, 2000

[54] DEVICE FOR THE APPLICATION OF JOINT MATERIAL DEPOSIT

[76] Inventors: David Finn, König-Ludwig-Weg 24, Pfronten, Germany, DE-87459; Manfred Rietzler, Am Alsterberg 10, Marktoberdorf, Germany, DE-87616

[21] Appl. No.: 09/068,613
[22] PCT Filed: Oct. 30, 1996
[86] PCT No.: PCT/DE96/02078
  § 371 Date: Jun. 15, 1998
  § 102(e) Date: Jun. 15, 1998
[87] PCT Pub. No.: WO97/17191
  PCT Pub. Date: May 15, 1997

[30] Foreign Application Priority Data
Nov. 10, 1995 [DE] Germany ............. 195 41 996

[51] Int. Cl.[7] ............................................. B23K 1/00
[52] U.S. Cl. .................... 228/41; 228/33; 228/51; 228/52; 228/1.1; 228/111
[58] Field of Search .................. 228/41, 33, 51, 228/52, 1.1, 111

[56] References Cited

U.S. PATENT DOCUMENTS 1,673,281  6/1928  Fay .
4,216,894  8/1980  Gleizes ............................. 228/52
4,936,501  6/1990  Babarin .
5,467,913  11/1995  Namekawa et al. .
5,828,031  10/1998  Pattanaik ........................ 219/121.3

FOREIGN PATENT DOCUMENTS 43 20 055 A1  12/1994  Germany .
WO 95/00279  1/1995  WIPO ..................... B23K 1/005

OTHER PUBLICATIONS

IBM Technical Disclosure Bulletin, vol. 32, No. 5a, Oct. 1989, New York US, pp. 332–335, XP000048936 "Solder Ring Placement for Multiple pin Electrical Connector".

*Primary Examiner*—Patrick Ryan
*Assistant Examiner*—M. Alexandra Elve
*Attorney, Agent, or Firm*—Darby & Darby

[57] ABSTRACT

Device for the singled-out application of joining material deposits (30), particularly solder beads, from a joining material reservoir (11) with an application device (13) and a singling-out device (12) for singling-out joining material deposits from the joining material reservoir, wherein the singling-out device (12) is designed as a conveying device (20) for the singled-out transfer of joining material deposits (30) to the application device (13).

22 Claims, 2 Drawing Sheets

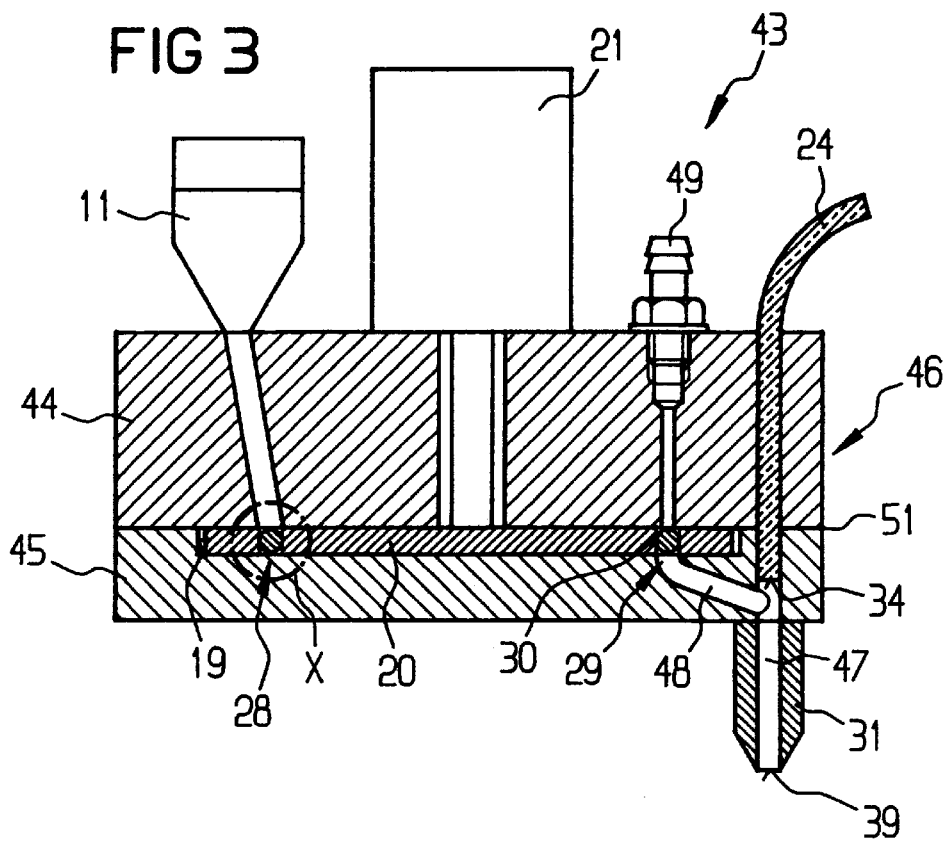
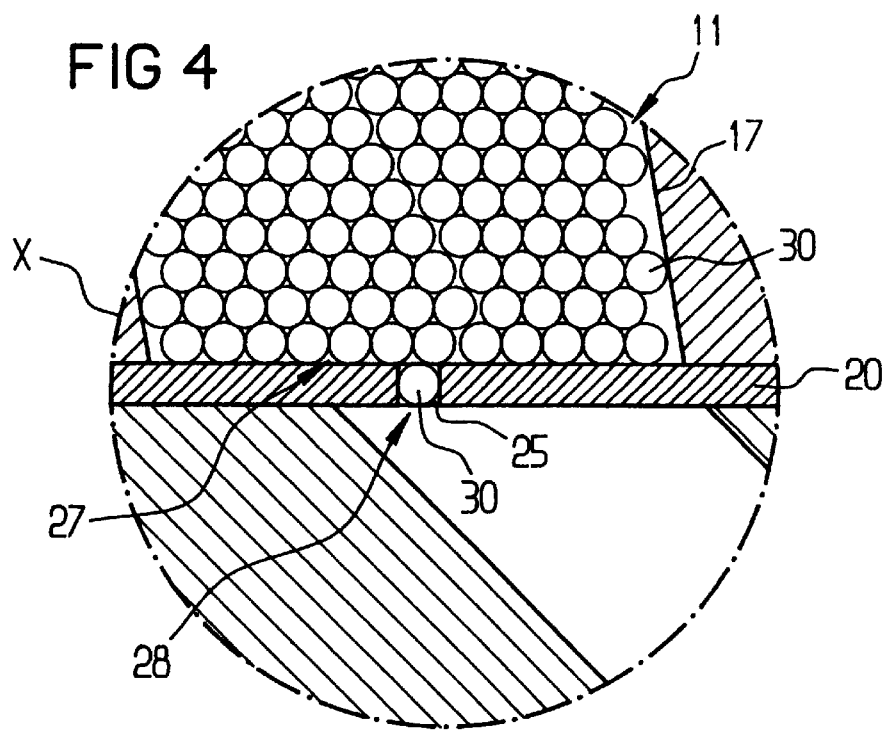

ately timed
DEVICE FOR THE APPLICATION OF JOINT MATERIAL DEPOSIT

FIELD OF THE INVENTION

The present invention relates to a device for the singled-out application of joining material deposits, particularly solder beads, from a joining material reservoir with an application device and a singling-out device for singling-out joining material deposits from the joining material reservoir.

BACKGROUND OF THE INVENTION

In the singular application of joining material deposits, also known by the term "single-point" process, the singling-out of the joining material deposits presented in a joining material reservoir has hitherto taken place by means of a singled-out uptake of the joining material deposits by means of the application device, which is operated after the fashion of a pick-and-place device. To do this it is necessary to convey the application device to the joining material reservoir, take a joining material deposit from it and then transfer it to the joint and place it there. On the basis of the above brief description of the known process it will be clear that the time required to apply a singled-out joining material deposit to a joint is substantially determined by the feed movements of the application device which are required for the singling-out of the joining material deposits. For obvious reasons, the known time-consuming application process for the application of singled-out joining material deposits is not suitable for commercial or industrial use.

BACKGROUND OF THE PRIOR ART

DE-A-4 320 055 discloses a device for the singled-out application of solder beads from a joining material reservoir with an application device and a singling-out device designed as a conveying device, which serves to convey solder beads singled-out from the joining material reservoir to the application device. This reference discloses a conveying device which is designed as a gravity conveying device.

U.S. Pat. No. 4,936,501 discloses a solder gun which serves to apply solder beads singled-out from a joining material reservoir in liquified state. To convey the solder beads singled-out from the joining material reservoir to the application device. This device is also provided with a gravity conveying device.

OBJECT OF THE INVENTION

The object of the present invention is to propose a device which enables a continuously and accurately timed the application of singled-out joining material deposits to be carried out.

BRIEF DESCRIPTION OF THE INVENTION

In the device according to the invention the singling-out device is designed as a circular conveying device device is designed as a circular conveying device, so that an arrangement of the transport uptake devices with a regular pitch is possible, which renders a pulsed operation of the application device possible.

In a preferred embodiment the singling-out device has transport uptake devices designed according to the size of the joining material deposits to be singled-out, which uptake devices are movable from an uptake position for the singled-out uptake of joining material deposits from the joining material reservoir into a discharge position for discharging the joining material deposits to the application device. By this means it is possible to feed the singled-out joining material deposits to the application device with a defined spacing from each other so that even if there is a fairly large distance between the joining material reservoir and the application device, the time required for transferring a joining material deposit to the application device is reduced to the time required to overcome the distance between two transport uptake devices.

The embodiment of the device described above is particularly advantageous if the singling-out device is designed as a circular conveying device, so that an arrangement of the transport uptake devices with a regular pitch is possible, which renders a pulsed operation of the application device possible.

If the singling-out device and the application device are combined in a structural unit, the device can be operated not only in a manner in which it is arranged in stationary fashion, wherein the joints to be provided with the joining material deposit application are moved past the application device, but, moreover, it may also be designed in a manner movable in one or more axes, so that in the manner of a bond head the device may be moved relative to the joints provided on substrates or the like.

If, in addition to the singling-out device and the application device, the joining material reservoir is also part of the same structural unit, the free movability of the entire device may be further improved In a particularly advantageous embodiment the singling-out device is designed as a disk conveyor with a conveyor disk driven in pulsed manner corresponding to the transport uptake device pitch. By this means the advantageous effects of the device described above may be achieved in a particularly simple structural manner If the joining material deposits in their discharge position are transferred into an application capillary which serves to place the joining material deposit at a joint, this permits a transfer and placing of the joining material deposit at and/or on the joint which can be achieved with the simplest means and which, in the simplest embodiment, may take place solely under the effect of gravity Furthermore, there is, however, also the possibility of providing a gas pressure application device acting on the joining material deposit, to support the transfer of the particular joining material deposit into the application capillary and/or to the joint.

Particularly when the gas used in the gas pressure application device is an inert gas, the gas may serve not only to apply pressure to the material deposit but also to create an inert atmosphere when making a thermal connection between the joining material deposit and the joint.

It also proves advantageous if a sensor for detecting joining material is arranged in the direction of conveyance of the singling-out device in front of the discharge position. This provides a reliable check as to whether a joining material deposit for application to the joint by means of the application device is actually present or not.

If, moreover, a sensor for detecting joining material is arranged in the direction of conveyance of the singling-out device behind the discharge position, it can be reliably ascertained whether an application of the joining material deposit transferred to the application device has actually taken place or not.

If the application device is connected to an energy device for generating the energy required to join a joining material deposit to the joint, which energy device is triggered as a function of the gas pressure created by the gas pressure application device, the gas pressure used in a supporting manner to transfer the material deposit to the application device may also be used to trigger the energy device at the same time. On the one hand this makes a separate triggering device superfluous. On the other hand it is ensured that the energy device is actually only triggered if a static overpressure is built up in the application capillary as a result of the joining material deposit acting as pressure resistance. Triggering therefore only actually takes place when a joining material deposit is available for application to the joint. This rules out false triggerings of the energy device.

If, to connect to a laser source to generate the energy required for a connection of a joining material deposit to the joint, the application device has an optical fibre opening into the application capillary, the type of triggering of the energy device described above may be particularly advantageously utilized to trigger an individual or a series of laser pulses. Regardless of the type of triggering of the energy device, the use of a laser source as energy device proves to be particularly advantageous, since by this means and in a particularly simple manner the devices required to generate energy may be arranged separately from the device and only a connection to the laser source via the optical fibre, which does not restrict the movability of the device, is required.

Furthermore, the application of a laser has the advantage that no elements movable with respect to the other fixtures of the device are required. Overall, this permits a particularly simple structural design of the device.

If, to transfer a joining material deposit from the discharge position into the application capillary, a feed capillary running downwards in inclined manner is provided, it is possible to arrange the end cross-section of the optical fibre, guided past the singling-out device, in the region of the tip of the application capillary, so as to have as small as possible a focussing distance between the optical fibre end cross-section and the joining material deposit when a joining material deposit is arranged in the application capillary and resting on the joint in question Preferred embodiments of the device according to the invention will be explained in greater detail below with reference to the drawings in which:

BRIEF DESCRIPTION OF THE DRAWINGS

FIG. 3 shows a second embodiment of a deposit applicator, partially in cross-section;

FIG. 4 shows an enlarged detail, denoted by X, of the deposit applicator shown in FIG. 3.

FIG. 1 shows a deposit applicator 10 with a joining material reservoir 11, a singling-out device 12 and an application device 13.

DETAILED DESCRIPTION OF THE INVENTION

Figure 1:
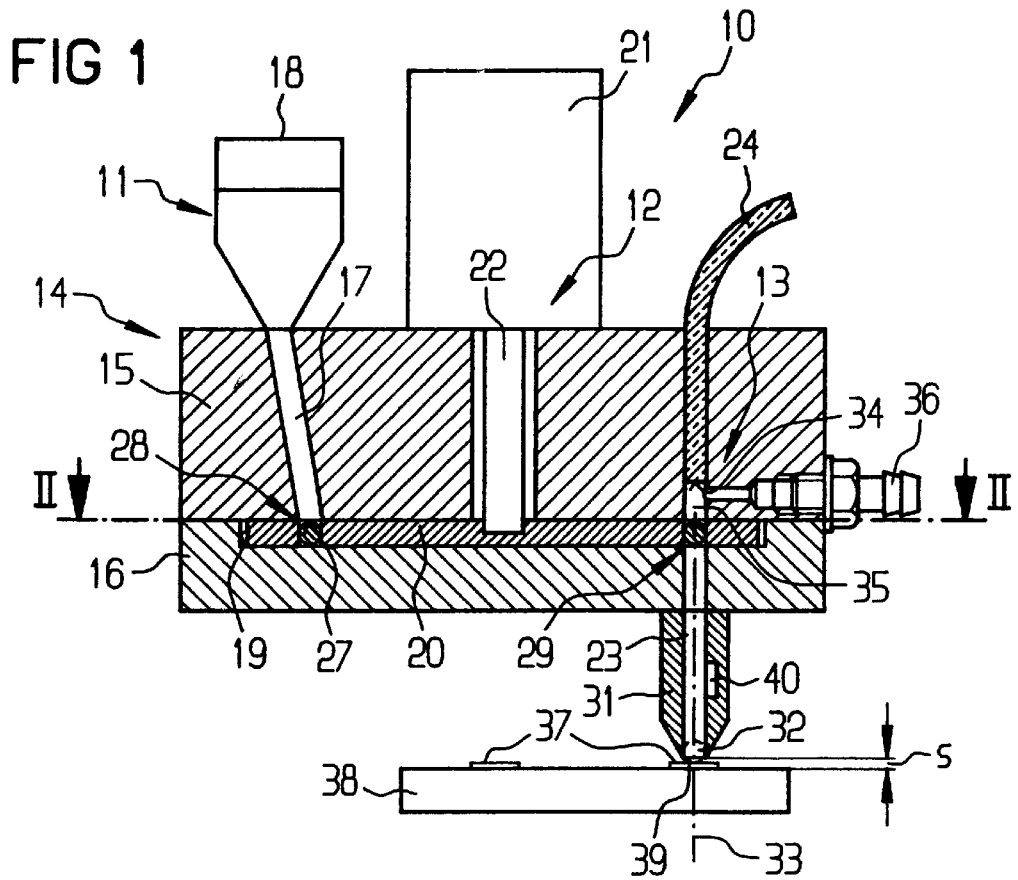
FIG. 1 shows a first embodiment of a deposit applicator, shown partially in cross-section.

In the deposit applicator 10 shown in FIG. 1, the joining material reservoir 11, the singling-out device 12 and the applicator device 13 are combined into a structural unit and arranged in and/or on a common housing 14. In this case the housing 14 has a housing upper part 15 and a housing lower part 16. The joining material reservoir 11 consists of an ascending duct 17 formed in the housing upper part 15 and a feed hopper 18 opening into the ascending duct 17 and mounted on the housing upper part 15. The ascending duct 17 opens into an acceptance chamber 19, formed in the housing lower part 16, to receive a conveyor disk 20 which forms the singling-out device 12 together with a drive motor 21. The conveyor disk 20 is connected to the drive motor 21, which is flanged onto the upper side of the housing upper part 15, by means of a drive shaft 22 which runs through the housing upper part 15.

Opposite the joining material reservoir 11 and arranged in the circumferential region of the conveyor disk 20 like the latter is the application device 13 which has an application capillary 23 and an energy application device formed here as optical fibre 24 and which is a component part of a laser device not shown in detail here.

Figure 2:
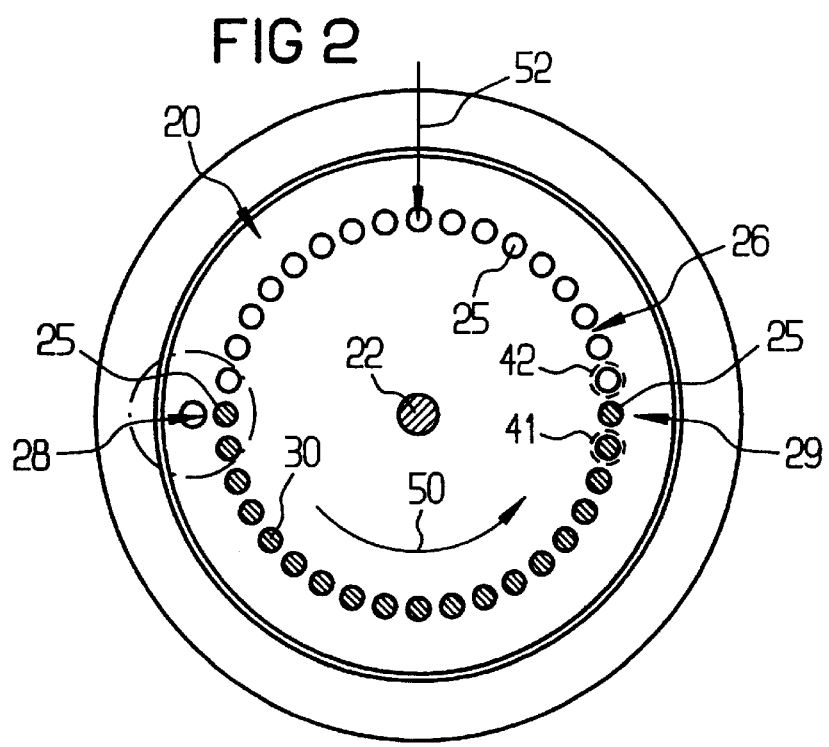
FIG. 2 shows a sectional view of the deposit applicator shown in FIG. 1 along the course of the line of intersection II—II of FIG. 1.

From the top view of the conveyor disk 20 shown in FIG. 2 it will be clear that it has a multiplicity of transport uptake devices 25, arranged in uniform pitch, on an uptake partial circle 26. As shown by the direction of rotation arrow 50, in this case the conveyor disk 20 is driven in an anti-clockwise manner by the drive motor 21. The drive is pulsed in a stepwise manner, so that when the conveyor disk 20 is stationary, in each case a transport uptake device 25 is in overlap with an outlet opening 27 of the ascending duct 17 and in overlap with the application capillary 23 of the application device 13. The overlap position of a transport uptake device 25 with the outlet opening 27 of the ascending duct 17 will be denoted below as uptake position 28 and the overlap position of a transport uptake device 25 with the application capillary 23 as discharge position 29.

As can be seen from FIGS. 1 and 2, joining material deposits 30 taken up in an unordered manner in the joining material reservoir 11 are taken up in a singled-out manner in the uptake position 28 by uptake into the transport uptake devices 25 by the conveyor disk 20. As a result of the rotational movement (arrow 50) of the conveyor disk 20, the joining deposits 30 taken up in the conveyor disk 20 in this way are moved forwards in the direction of the application device 13 and transferred to it in the discharge position 29 FIG. 2 shows that to the extent that the joining material deposits 30 in the uptake position 28 are transferred to the conveyor disk 20, as a result of the rotational movement (arrow 50) of the conveyor disk 20 the joining material deposits 30 are transferred to the application device 13 in the discharge position 29 with continuous operation of the singling-cut device 12, the stationary filling of the conveyor disk 20 via the half uptake partial circle 26 is thus adequately established.

FIG. 1 shows that the application capillary 23 of the application device 13 is provided with a capillary tip 31 which serves to place a joining material deposit 30 shown in an application position 32 by a dot-and-dash line in FIG. 1. The optical fibre 24 is inserted into the end region of the application capillary 23 opposite the capillary tip 31 in such a way that it is arranged coaxially with the application capillary 23 and substantially flush in respect of an exit beam direction 33. In the deposit applicator 10 shown in FIG. 1, the optical fibre 24 is arranged with its end cross-section 34 emitting laser radiation above the conveyor disk 20. Between the conveyor disk 20 and the end cross-section 34 is a capillary free space 35 into which a compressed gas connection 36 opens.

The compressed gas connection 36 serves to apply increased pressure to the capillary free space 35 so that the joining material deposit 30 arranged in the discharge position 29 is driven out of the transport uptake device 25 formed as a through hole and is transferred into the application position 32 denoted by a dot-and-dash line in FIG. 1. In the application position 32 the joining material deposit 30 rests on a connection surface 37 of a substrate for example formed as chip 38. Between an end cross-section 39 of the capillary tip 31 and the surface of the connection surface 37 is a gap s which is dimensioned in such a way that on the one hand the joining material deposit 30 is reliably retained in the application position 32 shown, and on the other hand is sufficient to permit a substantially unhindered thermal deformation of the joining material deposit 30 to form a raised contact metallization which is known by the technical term "bump" and is not shown in greater detail. In this way bumps such as are required to produce "flip-chip" contacts may be produced with the deposit applicator 10 and/or the deposit applicator 43 (FIG. 3).

In addition to the transfer of the joining material deposit 30 from the discharge position 29 into the application position 32, the application of compressed gas to the joining material deposit 30 also sexes to trigger the laser device. For this purpose a pressure sensor 40, which detects a static overpressure in the application capillary 23, is provided in the capillary tip 31 in the embodiment shown in FIG. 1. As a static overpressure in the application capillary 23 only builds up when the gap s is substantially closed by the joining material deposit 30 arranged in the application position 32, the laser device is also only triggered when a joining material deposit 30 is placed on the connection surface 37. Before this placing, a feed movement of the capillary tip in the vertical direction may optionally also take place.

A further way of verifying the presence of a joining material deposit 30 in the application capillary 23 consists of detecting an influence of the laser radiation emitted from the optical fibre 24 caused by the joining material deposit 30. For this purpose the reflection of the radiation or also a wavelength change of the radiation caused by the joining material deposit 30 may be detected.

Before the application of the joining material deposit, a pre-treatment of the joint, the connection surface 37 in this case, may take place in order to remove any oxide layers from the joint. Laser radiation of suitable wavelength and pulsing may be directed onto the joint by means of the optical fibre 24 for a pre-treatment of this kind.

As indicated in FIG. 2, a sensor 41 and 42 for detecting joining material are located on the uptake partial circle 26, each one pitch away from the discharge position 29. The sensor 41 is in front of the discharge position 29 in the direction of rotation (arrow 50) of the conveyor disk 20 and the sensor 42 behind the discharge position 29. Both sensors 41, 42 are arranged in the housing lower part 16 directly opposite the uptake partial circle 26. The sensor 41 thus makes it possible to determine whether a transport uptake device 25 is filled for subsequent transfer of a joining material deposit 30 to the application capillary in the discharge position 29. The sensor 42 verifies whether the joining material deposit 30 actually was transferred to the application capillary or not. The sensors 41, 42 thus serve to determine malfunctions, so that if sensor 41 detects an unfilled transport uptake device 25, the conveyor disk 20 may be moved further by one pitch. This also applies to cases in which the sensor 42 detects a joining material deposit 30 in the transport uptake device 25 after the discharge position 29 has been passed.

FIG. 3 shows a deposit applicator 43 which is largely designed in the same way as deposit applicator 10 shown in FIG. 1 and which, like deposit applicator 10, contains a conveyor disk 20 which is arranged in an acceptance chamber 19 between a housing upper part 44 and a housing lower part 45. As in the case of the deposit applicator 10 shown in FIG. 1, neighbouring surfaces of the housing upper part 44 and of the housing lower part 45 form limiting surfaces for the joining material deposits 30 taken up in transport uptake devices 25 formed as through holes, so that these are secured against falling out during their conveyance in the conveyor disk 20 from the uptake position 28 to the discharge position 29.

To permit a relative movement between the conveyor disk 20 and the adjoining housing parts 15, 16, a gap which is not shown in greater detail in FIGS. 1 and 3 is provided in each case between the opposing surfaces of the conveyor disk 20 and the housing upper part 15 and/or the housing lower part 16. A housing collar 51, formed like a flange, on the housing lower part 16 and/or 45 substantially serves to set this gap. To guarantee a constant gap at all times between the opposing surfaces of the conveyor disk 20 and the housing upper part 15, 44 and/or the housing lower part 16, 45 irrespective of the thickness of the conveyor disk 20 used and also with different conveyor disks 20, it is possible, by way of departure from the view of FIG. 3, to form the height of the housing collar 51 corresponding to the intended gap dimension and to form the necessary distance between the housing upper part 44 and the housing lower part 45 to form the uptake chamber 19 in such a way that a distance ring, which is not shown in greater detail here and is made of the same material blank together with the conveyor disk 20, is inserted concentrically with the conveyor disc 20 between the housing upper part 44 and the housing lower part 45. Making the distance ring from the same material blank as the conveyor disk guarantees that the conveyor disk 20 and the distance ring have an identical thickness.

In an enlarged view FIG. 4 shows the uptake of a joining material deposit 30 from the joining material reservoir 11 by the conveyor disk 20 in the uptake position 28. The joining material deposits 30 arranged in a closely adjoining manner in the ascending duct 17 of the joining material reservoir 11 are transferred into the transport uptake device 25 arranged in overlap with the outlet opening 27 of the ascending duct 17 under the effect of gravity. To support the transfer, ultrasound may be applied to the conveyor disk 20 or a part of the joining material reservoir 11 so that if the joining material deposits 30 are in an unfavourable relative position in the ascending duct 17, a tilting of joining material deposits which may impede the filling of the transport uptake device 25 may be prevented. Application of ultrasound of this kind is also possible by direct application onto the joining material deposit 30, by means of an ultrasound probe extending into the ascending duct 17 for example.

In contrast to the deposit applicator 10 shown in FIG. 1, the deposit applicator 43 has a modified application device 46, in which the joining material deposits 30 are not directly transferred from the discharge position 29 into an application capillary 47 but, starting from the discharge position 29, initially find their way into a feed capillary 48 which runs downwards in an inclined manner and opens into the application capillary 47.

As can be seen from FIG. 3, this means that the application capillary 47 with the optical fibre 24 opening into it may be guided past the conveyor disk 20 laterally. The consequence of this is that the end cross-section 34 of the optical fibre 24 may be guided closer to the end cross-section 39 of the capillary tip 31 so that a shorter distance between the end cross-section 34 and the joining material deposit 30 arranged in the application position 32 on the connection surface 37 (FIG. 1) can be set. This permits a greater melting performance when the joining material deposit 30 is melted by means of laser energy In order to be able to utilize the advantages of a compressed gas application, which were explained in detail in connection with the description of the deposit applicator 10, in the case of the deposit applicator 43 shown in FIG. 3 also, the deposit applicator 43 has a compressed gas connection 49 above the conveyor disk 20 which permits a direct application of compressed gas to the joining material deposit 30 arranged in the discharge position 29.

Although the deposit applicator embodiments shown serve to apply pieces of joining material deposits 30, spherical ones in this case, i.e. beads of solder, irrespective of the embodiment the deposit applicator is not restricted to the use of solid or piece-type joining material deposits. Rather, the use of liquid or viscous joining material deposits is also possible, wherein portioning appropriately then takes place on transfer from the joining material deposit reservoir to the singling-out device.

Particularly when using a deposit applicator 10 or 43 for the application of liquid or viscous joining material deposits it is advantageous if a cleaning device, not shown in greater detail here, is provided at a place, as shown by arrow 52 in FIG. 2, between the discharge position 29 and the uptake position 28 in the region of the unfilled conveyor disk 20. This cleaning device may be similar in design to the application device 13 or 46 with a compressed gas connection for the blowing-free of transport uptake devices 25 which are not completely empty and optionally additionally an optical fibre which permits a "burning free" of blocked transport uptake devices 25 by the application of laser to the transport uptake devices 25.

What is claimed is:

1. A device for the singled-out application of joining material deposits, particularly solder beads, from a joining material reservoir with an application device and a singling-out device for singling-out joining material deposits from the joining material reservoir, wherein the singling-out device is designed as a conveying device for the singled-out transfer of joining material deposits to the application device, wherein the singling-out device is designed as a circular conveying device being rotatably driven by a drive shaft of a motor and the circular conveying device having transport uptake devices designed according to the size of the joining material deposits to be singled out, the uptake devices are moveable from an uptake position for the singled-out uptake of joining material deposits from the joining material reservoir into a discharge position for discharging the joining material deposits to the application device.

2. A device according to claim 1, wherein the singling-out device and the application device are combined to form a structural unit.

3. A device according to claim 1, wherein the material reservoir, the singling-out device and the application device are combined to form a structural unit.

4. A device according to claim 1, wherein the singling-out device is designed as a disk conveyor with a conveyor disk driven in pulsed manner corresponding to the transport uptake device pitch.

5. A device according to claim 1, wherein the joining material deposits in their discharge position are transferred into an application capillary which serves to place the joining material deposit at a joint.

6. A device according to claim 5, wherein a compressed gas application device acting on the joining material deposit is provided to support the transfer of the particular joining material deposits into the application capillary.

7. A device according to claim 1, wherein a sensor for detecting joining material is arranged in the direction of conveyance of the singling-out device in front of the discharge position.

8. A device according to claim 7, wherein a sensor for detecting joining material is arranged in the direction of conveyance of the singling-out device behind the discharge position.

9. A device according to claim 1, wherein the application device is connected to an energy device for generating the energy required to join a joining material deposit to the joint, which energy device is triggered as a function of the gas pressure created by the compressed gas application device.

10. A device according to claim 1, wherein the application device is provided with an optical fibre opening into the application capillary to connect to a laser source to generate the energy required for a connection of a joining material deposit to the joint.

11. A device according to claim 1, wherein a feed capillary running downwards in an inclined matter is provided to transfer a joining material deposit from the discharge position into the application capillary.

12. A device for single-point application of joining material deposits onto a substrate having a plurality of connecting surfaces, the device comprising:

a reservoir for joining material (11);

a duct (17);

an application arrangement (13);

a singling-out device (12) including a circular conveying disk (20) having a plurality of openings (25, 27);

the circular conveying disk (20) is rotatable driven by a motor shaft;

the duct (17) connects the reservoir (11) and the singling-out device (12);

each of the plurality of openings (25, 27) accepts a single point of the joining material;

the circular conveying disk is rotatable such as to transport the single point joining material from an uptake position to a discharge position where the joining material is discharged as deposits onto one of the plurality of the connecting surfaces (38).

13. The device according to claim 12, wherein the joining material comprises a plurality of solder beads.

14. The device according to claim 13, wherein the plurality of openings are sized according to the solder beads.

15. The device according to claim 13, wherein the drive shaft is connected to the circular conveying disk (20).

16. The device according to claim 15, wherein the circular conveying disk is driven in a pulsed manner.

17. The device according to claim 16, wherein the application arrangement includes a capillary disposed above the discharge position and extending to one of the plurality of the connecting surfaces of the substrate.

18. The device according to claim 17, wherein the application arrangement is connected to compressed gas such that the compressed gas acts on each of the solder beads in the discharge position.

19. The device according to claim 18, wherein the capillary is connected to a sensor.

20. The device according to claim 19, wherein the sensor detects passing of each of the solder beads within the capillary.

21. The device according to claim 20, wherein the application arrangement is connected to an energy source for providing energy for moving the solder bead to one of the pluralities of the connecting surfaces of the substrate; and wherein the energy source is triggered by a pressure of the compressed gas.

22. The device according to claim 21, wherein the capillary includes an optical fibre disposed above the discharge position; and wherein the energy source is a laser connected to the optical fibre.

* * * * *